United States Patent Office 3,498,995
Patented Mar. 3, 1970

3,498,995
ISOTHIAZOLE SYNTHESIS
Donald Neil McGregor and Lee Cannon Cheney, Fayetteville, N.Y., assignors to Bristol-Myers Company, New York, N.Y., a corporation of Delaware
No Drawing. Filed July 25, 1966, Ser. No. 567,378
Int. Cl. C07d 91/12
U.S. Cl. 260—302     15 Claims

ABSTRACT OF THE DISCLOSURE

Isothiazoles, particularly 3,4,5-substituted isothiazoles, are of value as chemical intermediates in the synthesis of biologically active medicinal agents. As such a new and commercially feasible synthesis has been developed which entails reacting, for example, 1-amino-2-carbomethoxy-1-(2,6-dichlorophenyl)-1-buten-3-one with phosphorous pentasulfide, followed by mild oxidation, to produce methyl-3-(2,6-dichlorophenyl)-5-methyl-4-isothiazole-carboxylate.

BACKGROUND OF THE INVENTION

Field of the invention

A new process for the synthesis of isothiazoles.

Description of the prior art

Naito et al., U.S. Patent 3,341,518, suggests a variety of methods for the production of isothiazoles. None of these methods are identical to the instant process nor do they produce comparable yields.

SUMMARY OF THE INVENTION

The process of the instant invention comprises heating an aminoketone of the formula

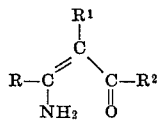

wherein R and $R^2$ are alike or different and each is (lower) alkyl or Ar, wherein Ar is a group of the formula

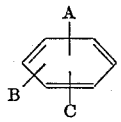

in which each of A, B and C represent hydrogen, fluoro, chloro, bromo, iodo, trifluoromethyl, methylsulfonyl, nitro, (lower)alkyl and (lower)alkoxy;

R' represents

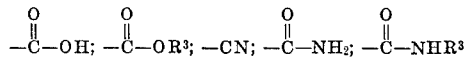

or

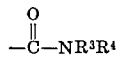

in which $R^3$ and $R^4$ are alike or different and each are lower)alkyl or A;

with phosphorous pentasulfide and a mild oxidizing agent to produce isothiazoles of the formula

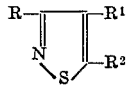

DETAILED DESCRIPTION

This invention relates to a new and superior process for the synthesis of substituted isothiazoles, particularly 3,4,5-substituted isothiazoles, which compounds are most valuable as chemical intermediates in the further synthesis of biologically active compounds such as the isothiazole penicillins and cephalosporins.

The never ending search for new and improved antibacterials, such as the synthetic penicillins, has led to the synthesis of a series of substituted isothiazole derivatives of 6-aminopenicillanic acid (6 APA). These penicillins have value as antibacterial agents, as nutritional supplements in animal feeds, as agents for the treatment of mastitis in cattle, as therapeutic agents in poultry and animals, including man, in the treatment of infectious diseases caused by gram-positive bacteria, especially *Staphylococcus aureus* and other penicillinase producing bacteria, and sometimes those infections caused by gram-negative bacteria.

The superior efficacy exhibited by the isothiazole penicillins required that a new and more efficient synthesis be developed for the preparation of large quantities of 3,4,5-substituted isothiazoles having the formula

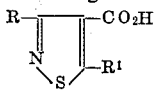

wherein R and $R^2$ are alike or different and each is (lower)alkyl or Ar, wherein Ar is a group of the formula

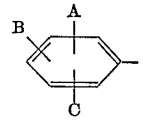

in which each of A, B and C represents hydrogen, fluoro, chloro, bromo, iodo, trifluoromethyl, methylsulfonyl, nitro, (lower)alkyl and (lower)alkoxy.

Some of the isothiazoles prepared by the process described herein are compounds that have been prepared previously by methods that gave yields that were low and commercially undesirable.

T. Naito and S. Nakagawa, in their U.S. patent applications Nos. 466,414 and 518,801, have both now abandoned reported yields that were generally well below 10% in the synthesis of these types of isothiazoles. Furthermore, their methods involved numerous long and tedious steps.

The new and novel process claimed herein helps to solve both problems by producing superior yields by a more direct and efficient synthesis.

The invention claimed herein is a new and novel process for the synthesis of isothiazoles of the formula

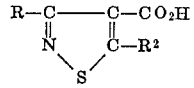

wherein R and $R^2$ are alike or different and each is (lower)alkyl or Ar, wherein Ar is a group of the formula

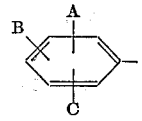

in which each of A, B and C represent hydrogen, fluoro, chloro, bromo, iodo, trifluoromethyl, methylsulfonyl, nitro, (lower)alkyl and (lower)alkoxy.

The process is usually performed by heating together a mixture of three reactants as shown by

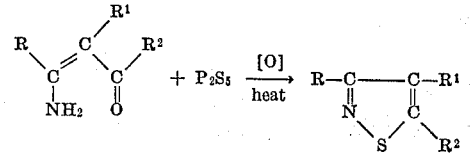

wherein R and R² are alike or different and each is (lower)alkyl or Ar, Ar being a group of the formula

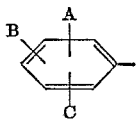

in which each of A, B and C represent hydrogen, fluoro, chloro, bromo, iodo, trifluoromethyl, methylsulfonyl, nitro, (lower)alkyl and (lower)alkoxy;

R¹ represents $$-\overset{O}{\underset{\|}{C}}-OR^4, -CN, -CO_2H, -\overset{O}{\underset{\|}{C}}-NH_2, -\overset{O}{\underset{\|}{C}}-NHR^4 \text{ or } -\overset{O}{\underset{\|}{C}}-NR^4R^3$$

in which R⁴ and R³ are alike or different and each is (lower)alkyl or Ar, wherein Ar is defined as above. When R¹ is $$-\overset{O}{\underset{\|}{C}}-NH_2, -\overset{O}{\underset{\|}{C}}-NHR^3 \text{ or } -\overset{O}{\underset{\|}{C}}-NR^3R^4,$$

the amide moiety will often be converted to cyano(—CN) or thioamido $$(-\overset{S}{\underset{\|}{C}}-NH_2, -\overset{S}{\underset{\|}{C}}-NHR^3, -\overset{S}{\underset{\|}{C}}-NR^3R^4)$$

said functional groups also being readily hydrolyzed to desired 4-isothiazolecarboxylic acids.

The reactants, as illustrated above, are mixed together in various molar proportions, but preferably in a ratio of one mole each of the aminoketone and oxidizing agent and two moles of phosphorous pentasulfide ($P_2S_5$, also known as $P_4S_{10}$).

[O], a mild oxidizing agent, is usually selected from the group consisting of 2,3-dichloro-5,6-dicyano-1,4-benzoquinone, oxygen, air, $I_2$, $Cl_2$, $Br_2$ $H_2O_2$, sulfur, ferric chloride, $Na_2S_2O_8$, chloranil or halogen in combination with an acid scavenger, e.g., organic amines, alkali metal carbonates, but preferably with chloranil, sulfur, iodine in combination with $K_2CO_3$, or 2,3-dichloro-5,6-dicyano-1,4-benzoquinone.

The reactants are usually dissolved or suspended in a reaction-inert solvent, e.g., benzene, toluene, xylene, dioxane, tetrahydrofuran, dimethylsulfoxide or ether, and the mixture is heated at a temperature of 0°–300° C., but preferably at the solvent reflux temperature, for a period of time generally determined by the temperature at which the reaction is conducted. When halogen in combination with an acid scavenger is employed, the oxidation step is usually carried out at room temperature subsequent to the heating of the aminoketone with $P_2S_5$. In the absence of a mild oxidant, the desired isothiazole is still formed, but in much lower yields, by internal oxidation or disproportionation.

The resultant mixture is cooled to room temperature, filtered to remove the unwanted solids and concentrated in vacuo to leave a crystalline or semi-solid mass that is subsequently purified by crystallization or chromatography to yield crystalline isothiazole.

When R¹ is other than —CO₂H, the isothiazole is hydrolyzed to the desired 4-isothiazole carboxylic acid by contact with acid or base.

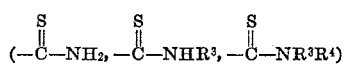

The isothiazole is usually hydrolyzed by contact with acid or base, preferably strong mineral acid or alkali metal base, preferably with the aid of heat and preferably in a polar solvent such as methanol, ethanol, isopropanol, butanol, ethylene glycol, propylene glycol or aqueous solutions thereof. Dilution and acidification of the hydrolysis mixture usually yields a crystalline solid that is further purified by recrystallization to yield the desired 4-isothiazolecarboxylic acid.

The aminoketones used as starting materials in this process may be prepared by several known methods, but preferably by Method I which gives high yields with minimal purification difficulties.

(I) VIA ISOXAZOLE

[Doyle & Nayler, U.S. Patent 2,996,501; J. Chem. Soc. 5838 (1963)]

a. $R-CHO + NH_2OH \cdot NaOH \xrightarrow{(1)} R-CO=NOH + NaCl$ b. $R-CH=NOH + NaOH + Cl_2 \xrightarrow[(2)]{HCl} R-\underset{Cl}{\overset{|}{C}}=NOH$ c.
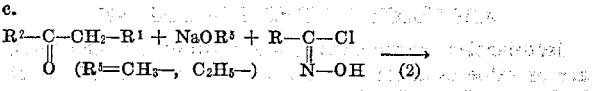

d.
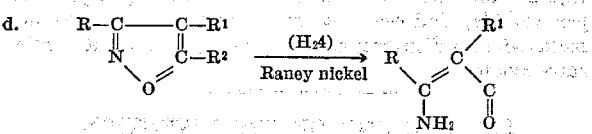

(II) VIA C-ACYLATION a. $3R-MgX + R^1-CH_2-CN \xrightarrow{(5)}$ b. $RCN + CH_3R^1 \xrightarrow{(6)}$ c. $R-\overset{O}{\underset{\|}{C}}-CH_2R^1 \xrightarrow{(7)}$

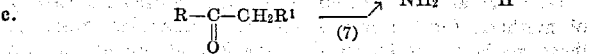

(d)
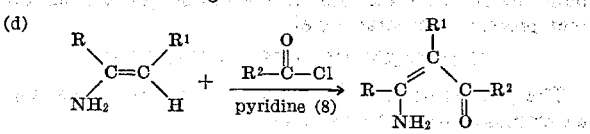

(1) Vogel, "Textbook of Practical Organic Chemistry," p. 883.

(2) G. W. Perrold et al., J. Am. Chem. Soc., 79, 462 (1957).

(3) A. Quilico and R. Fusco, Gazz. Chim. Ital. 67, 589 (1937); C.A. 32, 2117⁷.

(4) G. Stagno d'Alcontres, Gazz. Chim. Ital. 80, 441 (1950).

(5) R. Lukes and J. Kloubek, Coll. Czechoslov. Chem. Communs., 25, 609 (1960); R. Lukes and J. Kovar, Chem. Listy, 50, 272 (1956).

(6) Beilstein, 10, 681; EI 10, 322; EII 10, 469; Holzwart, J. Prakt. Chem. (2), 39, 242; E. Von Meyer, J. Prakt. Chem. (2), 92, 174.

(7) C. Korschun, Ber., 38, 1129 (1905).

(8) E. Benary, Ber., 42, 3912 (1909); E. Benary and M. Hosenfeld, Ber., 55, 3417 (1922); E. Benary et al., Ber., 55, 3420, 3426 (1922); Ber., 56, 910, 913 (1923).

The objectives of the present invention have been achieved, by the provision according to the present invention, of the process for the synthesis of isothiazoles having the formula

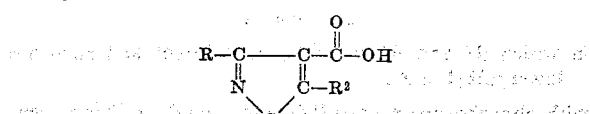

wherein:

R and R² are alike or different and each is (lower)alkyl or Ar—, wherein Ar is a group of the formula

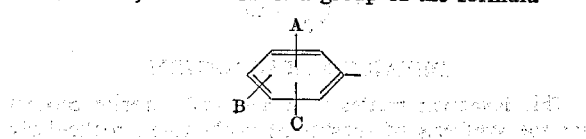

in which each of A, B and C represent hydrogen, fluoro, chloro, bromo, iodo, trifluoromethyl, methylsulfonyl, nitro, (lower)alkyl and (lower)alkoxy; which comprises:

heating together an aminoketone having the formula

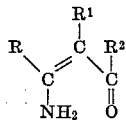

wherein:
R¹ represents

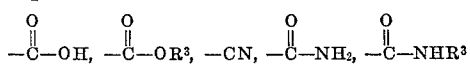

or

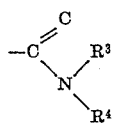

in which R³ and R⁴ are alike or different and are each (lower)alkyl or Ar—;
with phosphorous pentasulfide and
a mild oxidizing agent selected from the group of chloranil, sulfur, iodine, chlorine, bromine, $H_2O_2$ $FeCl_3$, $Na_2C_2$, $O_8$, air, 2,3-dichloro-5,6-dicyano-1,4-benzoquinone, iodine in combination with an acid scavenger, oxygen, but preferably chloranil, sulfur, iodine in combination with $K_2CO_3$, or 2,3-dichloro-5,6-dicyano-1,4-benzoquinone;
the aminoketone, the oxidizing agent and the phosphorous pentasulfide are preferably present in a molar ratio of about 1:1:2;
in an inert solvent preferably selected from the group consisting of benzene, toluene, xylene, ether, tetrahydrofuran, dioxane and dimethylsulfoxide,
at a temperature in the range of 0°–300° C. but preferably at about the solvent reflux temperature,
for a period of time up to ten hours but preferably about one hour; and
when R¹ is other than —CO₂H,
hydrolyzing the resultant oxidized product to a compound of the formula

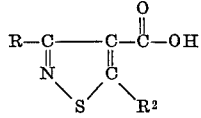

by contact with a strong mineral acid or alkali metal base,
preferably with the aid of heat, and
preferably in a polar solvent such as methanol, ethanol, isopropyl alcohol, butanol, ethylene glycol, propylene glycol or aqueous solutions thereof.

In the preferred embodiments of the present invention R is Ar as defined above and especially phenyl, halophenyl and dihalophenyl, R¹ is —CN or —CO₂R³ wherein R³ is defined above, R² is (lower)alkyl and especially methyl.

EXAMPLE 1

1-amino-2-carbomethoxy-1-(2,6-dichlorophenyl)-1-buten-3-one

A suspension of 200 g. (0.7 mole) of 4-carbomethoxy-3-(2,6-dichlorophenyl)-5-methylisoxazole prepared by the method of Doyle and Nayler, U.S. Patent 2,996,501, 50 g. of commercial Raney nickel and 1100 ml. of methyl alcohol was hydrogenated at 50 p.s.i.g. for 12 hours, after which time the theoretical amount of hydrogen had been absorbed. Filtration and concentration gave a crude tan material which was recrystallized from 450 ml. of acetonitrile to yield 119 g. (59.6%) of product of M.P. 152–155° C. An analytical sample was recrystallized from toluene and had M.P. 155–156.5° C. [G. Stagno d'-Alcontres, Gazz. Chim. Ital. 80, 441 (1950).]

*Analysis.*—Calc'd for $C_{12}H_{11}Cl_2NO_3$ (percent): C, 50.02; H, 3.85; N, 4.86. Found (percent): C, 50.12; H, 3.86; N, 4.78.

3-(2,6-dichlorophenyl)-5-methyl-4-isothiazole-carboxylic acid (a) $P_2S_5$, S method.—A mixture of 2.88 g. (0.01 mole) of 1-amino-2-carbomethoxy - 1 - (2,6-dichlorophenyl)-1-buten-3-one, 6.6 g. (0.03 mole) of phosphorous pentasulfide, 0.96 g. (0.03 mole) of sulfur, 2 g. of sand and 50 ml. of toluene was refluxed for 30 minutes. After cooling to 25°, the mixture was filtered and the toluene was removed under reduced pressure. The residue was taken up in 75 ml. of benzene, filtered, and placed on a 2 x 14 cm. column of (Merck) alumina. The benzene eluate was collected and the solvent removed under reduced pressure. The residue was treated with 30 ml. of methanol, filtered (sulfur), and concentrated under reduced pressure to 1.5 g. of a crystalline residue. This material was dissolved in 20 ml. of methanol and 10 ml. of water containing 0.55 g. of sodium hydroxide. After reflux for 2 hrs., the methanol was removed under reduced pressure, 5 ml. of water was added and the solution was washed with 15- and 10-ml. portions of ethyl acetate. After addition of 15 ml. of 1 N hydrochloric acid, the precipitate was removed by filtration, washed with water, and dried to yield 1.29 g. (45% overall) of crystals, M.P. 208–210°.

(b) $P_2S_5$, $I_2$ method.—A mixture of 23.2 g. (0.08 mole) of 1-amino-2-carbomethoxy - 1 - (2,6 - dichlorophenyl)-1-buten-3-one, 53.3 g. (0.24 mole) of phosphorous pentasulfide and 400 ml. of toluene was refluxed for 30 minutes. After cooling to 25°, the mixture was filtered and the filtrate was concentrated under reduced pressure to 34.6 g. of a red-brown oil. A 2.0 g. sample (5.8%) of this oil was removed for further study.

The remainder was treated with 400 ml. of benzene, filtered, and 11.0 g. (0.08 mole) of potassium carbonate and a solution of 20.3 g. (0.08 mole) of iodine in 50 ml. of benzene was added. After 55 minutes at 25°, the reaction mixture was washed with 200 ml. of 10% sodium bisulfite, dried over magnesium sulfate, then concentrated under reduced pressure to 20.2 g. of a brown oil which spontaneously crystallized. This was purified by passage over a 3.5 x 17 cm. column of (Merck) alumina in benzene solution, followed by recrystallization from methanol-water to yield 10.1 g. (42%) of crystals, the infrared spectrum of which was identical to that of an authentic sample.

Calc'd for $C_{12}H_9NO_2SCl_2$ (percent): C, 47.70; H, 3.00; N, 4.64. Found (percent): C, 47.85; H, 3.05; N, 4.46.

A solution of this material in 108 ml. of methanol and 54 ml. of water containing 2.56 g. of sodium hydroxide was refluxed for 2 hrs. After cooling to 25°, the methanol was largely removed under reduced pressure and the aqueous residue was washed with 20 ml. of ethyl acetate, then acidified with 65 ml. of 1 N hydrochloric acid. The precipitate was removed by filtration, washed with water and dried to give 5.75 g. of crystals, M.P. 215°. An additional 2.85 g. was obtained from the ethyl acetate extract, giving a hydrolysis yield of 91% and an overall yield of 38%. The infrared spectrum of the product was identical to that of an authentic sample.

Calc'd for $C_{11}H_7NO_2SCl_2$ (percent): C, 46.82; H, 2.43; N, 4.84; S, 11.27. Found (percent): C, 46.54; H, 2.45; N, 4.72; S, 11.53.

(c) $P_2S_5$ method.—The 2.0 g. sample from method (b) was purified by chromatography on a 2 x 11 cm. column of (Merck) alumina. Eluates of benzene, benzene-ethyl acetate, ethyl acetate, and acetone were combined and concentrated under reduced pressure to a crystalline residue. This was recrystallized from methanol-water to yield 0.403 g. (30% yield from the starting aminoketone)

of crystals, M.P. 82–85°. The infrared spectrum of this material is identical to that of an authentic sample.

(d) $P_2S_5$ *chloranil method*.—A mixture of 2.88 g. (0.01 mole) of 1-amino-2-carbomethoxy-1-(2,6-dichlorophenyl)-1-buten-3-one, 6.66 g. 0.03 of phosphorous pentasulfide, 2.45 g. (0.01 mole) of chloranil, and 50 ml. of toluene was refluxed for 15 minutes in an oil bath held at 120°. After cooling to 25°, the mixture was filtered and the filtrate was concentrated under reduced pressure to a mixture of oil and solid. This residue was treated with 50 ml. of benzene, filtered, and concentrated under reduced pressure to a volume of about 20 ml. This solution was placed on a 1 x 29 cm. column of (Merck) alumina and eluted with 250 ml. of benzene. The eluate was concentrated under reduced pressure to a solid which, on crystallization from methanol-water, yielded 1.6 g. (53%) of the ester, M.P. 81–84°.

3-(2,6-dichlorophenyl)-5-methyl-4-isothiazole-carboxylic acid

A mixture of 302 g. (1 mole) of 4-carbomethoxy-3-(2,6-dichlorophenyl-5-methylisothiazole, 4 liters of methanol, and 2 liters of 1 N sodium hydroxide was refluxed for 2 hours. The reaction mixture was cooled to about 25° and the methanol was removed under reduced pressure. The aqueous solution was washed with 3 liters of ethyl acetate, then acidified with 3 liters of 1 N hydrochloric acid. The precipitate was removed by filtration, washed with water, and dried to yield 262 g. (91%) of 3-(2,6-dichlorophenyl) - 5 - methyl-4-isothiazolecarboxylic acid M.P. 208–210°. Recrystallization from 8 liters of toluene yielded 193 g. (67%), M.P. 211–212°.

3-(2,6-dichlorophenyl)-5-methyl-4-isothiazolecarbonyl chloride

To 577 mg. (0.002 mole) of 3-(2-6-dichlorophenyl)-5-methyl-4-isothiazolecarboxylic acid was added 5 ml. of thionyl chloride and the resulting solution refluxed gently for one and a half hours. The excess $SOCl_2$ was removed in vacuo at 25° C. leaving a crystalline residue. This residue was used in the next step without further purification.

Sodium 6-[3-(2,6-dichlorophenyl)-5-methyl-4-isothiazolecarboxamido]-penicillanate hydrate The crude acid chloride was dissolved in 5 ml. of acetone and added all at once to a previously prepared, stirred and cooled solution (5° C.) of 500 mg. 6-aminopenicillanic acid, 500 mg. of $NaHCO_3$, 10 ml. of water and 5 ml. of acetone. Stirring at 5° to 10° C. was continued for 10 minutes and then for 30 minutes with the ice bath removed. The actone was then removed at 20° C. under reduced pressure and 20 ml. $H_2O$ added to the concentrate. This aqueous solution was extracted once with 50 ml. of ether and the ether discarded. The aqueous solution was then layered with 40 ml. of ethyl acetate and stirred and cooled while being acidified to pH 2 with excess 40 percent $H_3PO_4$. The ethyl acetate layer was washed with three 25 ml. portions of water and two 25 ml. portions of saturated NaCl solution. Next, the organic layer was dried 10 minutes over $Na_2SO_4$, filtered, and treated with 0.740 ml. (0.002 mole) of SEH (a solution of sodium 2-ethylhexanoate in n-butanol whose concentration is 37 ml.=0.1 mole). The ethyl acetate solution was concentrated at 20° C. under reduced pressure to an oil and the oil redissolved in 25 ml. of MIBK (methyl isobutyl ketone). Two drops of water were added and the sides of the flask scratched. After one hour there was collected 840 mg. of MIBK washed, acetone washed, pet. ether washed and air dried material. It decomposed slowly above 182° C.

EXAMPLE 2

4-carbomethoxy-3-(2,6-dichlorophenyl)-5-methylisothiazole

Using the standard work-up procedure described below, various sets of conditions for this reaction were evaluated.

A mixture of 2.88 g. (0.01 mole) of 1-amino-2-carbomethoxy - 1 - (2,6 - dichlorophenyl)-1-buten-3-one, 50 ml. of toluene, and the other reactants was refluxed as outlined in Table I. The reacted mixture, after cooling to about 25° and stirring for 30 minutes, was filtered and the toluene was removed under reduced pressure from the filtrate. The residue was taken up in 75 ml. of benzene, filtered, and concentrated to a volume of 20 ml., which was placed on a 1 x 29-cm. column of alumina and eluted with 250 ml. of benzene. The solvent was removed from the eluate under reduced pressure and the residue was crystallized from 20 ml. of methanol and 60 ml. of water.

TABLE I

| No. | Moles $P_2S_5$ | Moles chloranil | Moles S | Time, min. | Percent yield |
|---|---|---|---|---|---|
| 1 | [1] 0.03 | | 0.03 | 10 | 38 |
| 2 | [1] 0.03 | | 0.03 | 30 | 37 |
| 3 | [1] 0.03 | | 0.03 | [3] 30 | 37 |
| 4 | [2] 0.03 | | 0.03 | 15 | 43 |
| 5 | [1] 0.03 | 0.01 | | 15 | 53 |
| 6 | [2] 0.03 | 0.01 | | 15 | 61 |
| 7 | [2] 0.02 | 0.01 | | 15 | 61 |
| 8 | [2] 0.01 | 0.01 | | 15 | 50 |
| 9 | [2] 0.03 | 0.02 | | 15 | 37 |
| 10 | [1] 0.03 | [4] | | 15 | 33 |

[1] Old $P_2S_5$ used.
[2] Fresh $P_2S_5$ used.
[3] Run at 100° instead of reflux.
[4] 001 mole of 2,3-dichloro-5,6-dicyano-1,4-benzoquinone.

EXAMPLE 3

4-carbamoyl-3-(2,6-dichlorophenyl)-5-methylisoxazole

A solution of 50 g. (0.17 mole) of the acid chloride of 3-(2,6-dichlorophenyl) - 5 - methyl-4-isoxazolecarboxylic acid, prepared by the method of Doyle and Nayler, U.S. Patent 2,996,501, in 300 ml. of tetrahydrofuran was added to 300 ml. of cold concentrated ammonium hydroxide and the resulting mixture was stored at about 25° for 18 hours. The tetrahydrofuran was removed from the reaction mixture under reduced pressure, and the solid was removed by filtration, dissolved in ethyl acetate, and washed with aqueous sodium hydroxide. The ethyl acetate was removed under reduced pressure and the residue was recrystallized from ethanol-water, yielding 28.1 g. (61%) of crystals, M.P. 166°.

Calc'd for $C_{11}H_8N_2O_2Cl_2$ (percent): C, 48.73; H, 2.97; N, 10.33. Found (percent): C, 48.85; H, 3.07; N, 10.15.

4-cyano-3-(2,6-dichlorophenyl)-5-methylisoxazole

A mixture of 26 g. (0.096 mole) of 4-carbamoyl-3-(2,6-dichlorophenyl)-5-methylisoxazole, 36 ml. (0.26 mole) of triethylamine, and 200 ml. of phosphorous oxychloride was refluxed for 2 hours. The excess $POCl_3$ and triethylamine was then removed under reduced pressure, and the residue was dissolved in chloroform and added to ice. The aqueous layer was made basic to litmus by the addition of sodium carbonate, and the layers were separated. The chloroform layer was then washed with water, dried over magnesium sulfate, and concentrated under reduced pressure to a solid, which was recrystallized from 2-propanol-water, yielding 19.4 g. (80%) of crystals, M.P. 99–100°.

Calc'd for $C_{11}H_6N_2OCl_2$: C, 52.19; H, 2.19; N, 11.07. Found: C, 52.03; H, 2.54; N, 10.81.

1-amino-2-cyano-1-(2,6-dichlorophenyl)-1-buten-3-one

A solution of 5 g. (0.019 mole) of 4-cyano-3-(2,6-dichlorophenyl) - 5 - methylisoxazole in 100 ml. of ethanol was shaken with about 2 g. of Raney nickel and hydrogen at 50 p.s.i. in a Parr apparatus. When one equivalent of hydrogen had been absorbed, the hydrogenation was stopped, the catalyst was removed by filtration with diatomaceous earth, and the solvent was removed under reduced pressure. The residue was recrystallized from 2-propanol-water and ethyl acetate-"Skellysolve B" (petroleum solvent, B.P. 60–68° C., essentially n-hexane), yielding 2.26 g. of crystals. M.P. 231–232°. G. Stagno d'Alcontres, Gazz. Chem. Ital. 80, 441 (1950).

Calc'd for $C_{11}H_8N_2OCl_2$: C, 51.79; H, 3.16; N, 10.98. Found: C, 51.57; H, 3.10; N, 10.85.

4-cyano-3-(2,6-dichlorophenyl)-5-methylisothiazole

A mixture of 3.0 g. (0.012 mole) of 1-amino-2-cyano-1-(2,6-dichlorophenyl)-1-buten-3-one, 8 g. (0.036 mole) of phosphorus petasulfide 1.15 g. (0.036 mole) of sulfur and 80 ml. of toluene was refluxed for three hours (note that, after 30 minutes reflux, no isothiazole and a 57% recovery of starting material was obtained). The mixture was filtered while hot, then cooled in ice and filtered again. The toluene was removed under reduced pressure, and the residue was taken up in ethyl acetate, filtered, then concentrated under reduced pressure to a solid. Two recrystallizations of this solid from 95% ethanol yielded 1.05 g. (33%) of crystals, M.P. 120–122°.

Calc'd for $C_{11}H_6N_2SCl_2$: C, 49.08; H, 2.24; N, 10.41. Found: C, 48.69; H, 2.28; N, 10.14.

EXAMPLE 4

1-amino-2-carbamoyl-1-(2,6-dichlorophenyl)-1-buten-3-one

A solution of 10.84 g. (0.04 mole) of 4-carbamoyl-3-(2,6-dichlorophenyl)-5-methylisoxazole, described in Example 3, in 200 ml. of ethanol was shaken with about 4 g. of Raney nickel and hydrogen at 50 p.s.i. in a Parr apparatus. When one equivalent of hydrogen had been absorbed, the hydrogenation was stopped, the catalyst was removed by filtration with diatomaceous earth, and the solvent was removed under reduced pressure. Recrystallization of the residue from ethanol-water yielded 7.51 g. (69%) of crystals. A sample was recrystallized from 2-propanol-water for analysis, M.P. 226–228°.

Calc'd for $C_{11}H_{10}N_2O_2Cl_2$: C, 48.37; H, 3.69; N, 10.26. Found: C, 48.40; H, 3.88; N, 10.26.

4-carbamoyl-3-(2,6-dichlorophenyl)-5-methylisothiazole

A mixture of 8.19 g. (0.03 mole) of 1-amino-2-carbamoyl-1-(2,6-dichlorophenyl)-1-buten-3-one, 20 g. (0.09 mole) of phosphorus pentasulfide, 2.88 g. (0.09 mole) of sulfur, and 150 ml. of toluene was refluxed for 30 minutes. After cooling to about 25°, the mixture was filtered, and the toluene was removed under reduced pressure from the filtrate. The residue was dissolved in about 100 ml. of ethyl acetate, filtered, concentrated to a volume of about 30 ml., filtered again, then concentrated to an oil. From this oil was isolated 1.6 g. (20%) of 3-(2,6-dichlorophenyl)-4-cyano-5-methylisothiazole, M.P. 112–122°, and 1.6 g. (19%) of 3-(2,6-dichlorophenyl)-4-thiacarbamoyl-5-methylisothiazole, M.P. 221–224°.

Calc'd for $C_{11}H_8N_2S_2Cl_2$: C, 43.56; H, 2.65; S, 21.14. Found: C, 43.56; H, 3.07; S, 21.86.

This isolation is most conveniently carried out on an alumina column, the nitrile being eluted with benzene and the amide with 1:1 benzene-ethyl acetate.

Both the nitrile and thioamide obtained above were hydrolyzed with aqueous acid to the known 3-(2,6-dichlorophenyl)-4-carboxy-5-methylisothiazole.

EXAMPLE 5

4-carbethoxy-3-(2,6-dichlorophenyl)-5-ethylisoxazole

To a cold (5–10° C.) slurry of 37.8 g. (0.2 mole) of 2,6-dichlorobenzaloxime in 200 ml. of water was added with vigorous stirring, 425 ml. (~0.2 mole) of sodium hypochlorite solution (clorox, ~5.25%) dropwise so as to maintain the temperature at 5–10°. After the addition was completed, the mixture was stirred for 0.5 hour. The intermediate 2,6-dichlorobenzonitrile oxide was collected by filtration and was thoroughly washed with ice-water. It was then slurred with 200 ml. of absolute ethanol, cooled to 5°, and was treated with 30 g. (0.208 mole) of ethyl propionylacetate. To the well-stirred mixture was then added dropwise a solution of 1.76 g. of sodium hydroxide in 40 ml. of ethanol. An exothermic reaction occurred and the temperature rose to 35°. The clear solution was stirred for 10 min. and the solvent was then removed in vacuo. The oily residue was slurried with 200 ml. of water and 200 ml. of ether and the layers were separated. The aqueous phase was extracted with 2 x 150 ml. portions of ether and the ether extracts were combined and dried over magnesium sulfate. On evaporation of the solvent there remained a crystalline solid. This was slurried with "Skellysolve B" and filtered to give 17 g. of product. The filtrate on cooling provided 21.5 g. of the ester. Recrystallization from ether-"Skellysolve B" and then from "Skellysolve B" gave 33.6 g., 53.5% of colorless prisms of M.P. 62–63°. Infrared and "N.M.R." (nuclear magnetic resonance) spectra were fully consistent with the assigned structure. The analytical specimen was crystallized from aqueous ethanol to give colorless platelets of M.P. 61–62°.

Calc'd for $C_{14}H_{13}Cl_2NO_3$: C, 53.52; H, 4.17. Found: C, 53.34; H, 4.64.

1-amino-2-carbethoxy-1-(2,6-dichlorophenyl)-1-penten-3-one

A solution of 31.8 g. (0.1 mole) of 4-carbethoxy-3-(2,6-dichlorophenyl)-5-ethylisoxazole in 200 ml. of 95% ethanol was shaken in a Parr shaker for 5 hours with Raney nickel catalyst under an atmosphere of hydrogen under an initial pressure of 45 p.s.i. The catalyst was removed by filtration through diatomaceous earth and the filtrate was evaporated to dryness. The residue was dissolved in hot ethyl acetate and the filtered solution was cooled. Addition of "Skellysolve B" caused precipitation of a colorless solid of M.P. 105–110°. Recrystallization from a mixture of ethyl acetate and "Skellysolve B" afforded 26.2 g. (83%) of crystalline material of M.P. 109.5–110.5°. The infrared and "N.M.R." spectra confirmed the structure.

Calc'd for $C_{14}H_{15}Cl_2NO_3$: C, 53.49; H, 4.79. Found: C, 53.25; H, 4.91%.

3-(2,6-dichlorophenyl)-5-ethyl-4-isothiazolecarboxylic acid

A mixture of 3.16 g. (0.01 mole) of the above reduction product, 0.96 g. (0.03 mole) of sulfur and 6.65 g. (0.03 mole) of phosphorous pentasulfide in 80 ml. of toluene was heated under reflux with stirring for 3 hours. The cooled mixture was then filtered and the filtrate was evaporated to dryness. The residue was slurried with ethyl acetate and again filtered to remove sulfur. The filtrate was evaporated to dryness and the residue was dissolved in the minimum volume of benzene. This solution was filtered through a column of alumina (Merck, Reagent Grade). Elution with benzene gave more sulfur, and then 1.37 g. of crude isothiazole ester as an oil.

Repetition of this reaction using 2.45 g. (0.01 mole) of chloranil in place of the sulfur, and a reaction time of 30 min. afforded 1.90 g. of crude ester.

3 g. (.0091 mole) of the unpurified ester was dissolved in 20 ml. of 50% aqueous methanol containing 1.0 g. (.018 mole) of potassium hydroxide, and the mixture was heated under reflux with stirring for 2 hrs. After dilution with 20 ml. of water, the mixture was stored for 16 hrs. at room temperature. The methanol was removed under reduced pressure and the aqueous residue was extracted with ethyl acetate. The aqueous phase was separated and acidified to pH 2 and extracted with 2×100 ml. portions of ethyl acetate. After the combined extracts had been dried over magnesium sulfate, the solvent was removed to provide a yellow solid of M.P. 205–206°. Recrystallization from toluene gave 1.24 g., 59% of white crystals of M.P. 206–208°. The infrared spectrum (KBr disc) showed absorptions (cm.$^{-1}$) due to —OH at 3100–2400 (broad); carboxyl C=O as a doublet at 1720 and 1680; and the trisubstituted phenyl at 792.

Sodium 6-[3-(2,6-dichlorophenyl)-5-ethylisothiazole-4-carboxamido]pencillanate

A mixture of 1.24 g. (4.14 mmole) of the isothiazole acid and 15 ml. of thionyl chloride was heated on a steam-bath for 1 hour. The excess thionyl chloride was then removed under reduced pressure. The residual acid chloride was dissolved in 5 ml. of acetone and this solution was added to a stirred and chilled (0–5°) solution of 0.895 g. (4.14 mmole) of 6-amino-pencillanic acid and 1.041 g. (12.4 mmole) of sodium bicarbonate in 15 ml. of water and 10 ml. of acetone. The ice-bath was removed and the mixture was stirred for 20 minutes. After the mixture had been extracted with ethyl acetate, the aqueous phase was acidified to pH 2 with 40% phosphoric acid and quickly extracted with 2×25 ml. of ethyl acetate. The combined extracts were washed with cold water and dried over magnesium sulfate and were then treated with 1.20 g (4.14 mmole) of a 50% solution of sodium 2-ethylhexanoate in ether. The resulting turbid solution was evaporated to low volume and treated with an excess of anhydrous ether to give a colorless solid. This was collected by filtration, washed with ether and dried in vacuo over phosphorus pentoxide. The yield of the penicillin was 1.27 g. (63.5%). Infrared and N.M.R. spectra were fully consistent with the assigned structure. An analytical sample was prepared by recrystallization from a 2-propanol-water mixture.

Calc'd for $C_{20}H_{18}Cl_2N_3O_4S_2$ Na: C, 45.98; H, 3.47. Found: C, 46.06; H, 3.77%.

EXAMPLE 6

3-(2-chloro-6-fluorophenyl)-5-methyl-4-isoxazole-carbolyic acid

To a stirred and cooled slurry of 52 g. (0.3 mole) of 2-chloro-6-fluorobenzaldoxime [C.A. 31: 381$^6$; Ber. 69B, 2253–8 (1936)] in 300 ml. of chloroform at −10° C. was added 24 g. (0.33 mole) of chlorine in 300 ml. of chloroform over a twenty minute period. The cooling bath was then removed and stirring continued for 2.5 hours. The CHCl$_3$ was then removed at 20° C. under reduced pressure and the residual oil dissolved in 100 ml. of methanol and added over a one minute period to a −30° C. stirred solution of 300 ml. methanol, 16.2 g. (0.3 mole) of sodium methoxide and 39 g. (0.3 mole) of ethyl acetoacetate. The exothermic reaction was controlled with Dry-Ice-acetone bath to keep the temperature below −10° C. After 30 minutes at 0° C. to −5° C. the bath was removed and stirring continued for 12 hours at room temperature (22° C.). The methanol was then removed in vacuo at 22° C. and the oil residue shaken with 300 ml. ether and 300 ml. of water. The ether layer was washed with three 100 ml. portions of water and then evaporated to an oil. The oil was then saponified at reflux for 2 hours in a solution of 300 ml. methanol, 100 ml. H$_2$O and 24 g. of sodium hydroxide. The methanolic solution was then concentrated to remove the methanol and 300 ml. of water added. The aqueous solution was extracted with two 300 ml. portions of ether and then placed on the rotary flash evaporator to remove dissolved ether. The solution was then cooled and stirred while being acidified to pH 2 with 40% phosphoric acid. The crystalline product was then filtered off, washed several times with water and air dried. One recrystallization from methanol-water gave 52 g.; M.P. 205–206° C.

Analysis.—Calc'd for $C_{11}H_7ClFNO_3$: C, 51.8; H, 2.76; N, 5.49%. Found: C, 51.9; H, 2.75; N, 5.67%.

4-carbomethoxy-3-(2-chloro-6-fluorophenyl)-5-methylisoxazole

To 51 g. (0.2 mole) of 3-(2-chloro-6-fluorophenyl)-5-methyl-4-isoxazolecarboxylic acid was added 100 ml. of thionyl chloride and the mixture heated at gentle reflux for four hours. The excess SOCl$_2$ was removed at 25° C. under reduced pressure and the crude acid chloride dissolved in 300 ml. of methanol. This solution was refluxed for three hours and then concentrated to an oil under reduced pressure. The residue was crystallized in "Skellysolve B" and recrystallized from cyclohexane to give 37 g., M.P. 55–56° C.

Analysis.—Calc'd for $C_{12}H_9ClFNO_3$: C, 53.33; H, 3.34; N, 5.19%. Found: C, 53.69; H, 3.45; N, 4.96%.

1-amino-2-carbomethoxy-1-(2-chloro-6-fluorophenyl)-1-buten-3-one

To 27 g. (0.1 mole) of methyl 3-(2-chloro-6-fluorophenyl)-5-methyl-4-isoxazolecarboxylate in 150 ml. of methanol was added approximately 5 g. of commercial Raney nickel catalyst and the mixture hydrogenated at an initial pressure of 50 p.s.i. for 5.5 hours, at which time the Parr apparatus showed an uptake of 9 lbs. (0.1 mole) of H$_2$. The catalyst was then filtered off, washed with methanol and the combined filtrates concentrated to an oil under reduced pressure at 20° C. The oil slowly crystallized but a suitable recrystallization solvent was not found due to its very low melting point. The product was used "as is" for the next step.

3-(2-chloro-6-fluorophenyl)-5-methyl-4-isothiazolecarboxylic acid

A mixture of 27.1 g. (0.1 mole) of 1-amino-2-carbomethoxy-1-(2 - chloro - 6 - fluorophenyl)-1-buten-3-one, 66.6 g. (0.3 mole) of P$_2$S$_5$, 24.6 g. (0.1 mole) of chloranil in 600 ml. of toluene was stirred at reflux for 20 minutes. The mixture was filtered and the filtrate evaporated under reduced pressure at 20° C. to an oil. To this oil was added 900 ml. of benzene and the solution filtered to remove a small amount of solids. The solution was concentrated under reduced pressure at 20° C. to a volume of about 100 ml. This solution was placed on a 26½ x 7½ cm. column of (Merck) alumina and eluted with 3.5 liters of benzene. Concentration of the eluate under reduced pressure left an oil which was saponified at reflux in 150 ml. methanol, 50 ml. water and 4 g. of sodium hydroxide. The methanol was removed in vacuo and 180 ml. water added. Two 200 ml. ether extracts were taken and discarded. The aqueous phase was cooled and acidified to pH 2 with 40% H$_3$PO$_4$. The resulting crystalline precipitate was filtered off, washed with three 100 ml. portions of water and air dried. Recrystallization from ethanol-water (1:1 by volume) gave 14.5 g., M.P. 199–201° C. (53.7% of theory).

Analysis.—Calc'd for $C_{11}H_7ClFNO_2S$: C, 48.53; H, 2.59; S, 11.76%. Found: C, 49.30, 48.96; H, 2.89, 2.71; S, 11.80, 11.88%.

Sodium 6-[3-(2-chloro-6-fluorophenyl)-5-methyl-4-isothiazole-carboxamido]-penicillanate monohydrate To 6.8 g. (0.025 mole) of 3-(2-chloro-6-fluorophenyl)-5-methyl-4-isothiazolecarboxylic acid was added 30 ml. of thionyl chloride and the mixture heated at reflux for 1.5 hours on the steam bath. The excess SOCl$_2$ was then removed at 20° C. under reduced pressure. The remaining oil was dissolved in 50 ml. of acetone and added, all at once, to a vigorously stirred solution of 5.4 g. (0.025 mole) of 6-APA, 8.4 g. (0.1 mole) of NaHCO$_3$ in 100 ml. of water and 50 ml. of acetone at 5° C. After 10 minutes the ice bath was removed and stirring was continued for one and one half hours. The acetone was then removed under reduced pressure at 20° C. Fifty ml.

of water was added and the solution extracted with two 100 ml. portions of ether and the ether extracts discarded. The aqueous phase was then layered with 75 ml. of methyl isobutyl ketone (MIBK) and stirred and cooled while being acidified to pH 2 with 40% $H_3PO_4$. The MIBK extract was washed two times with 50 ml. portions of water and two times with 75 ml. portions of saturated $Na_2SO_4$ solution. The MIBK solution was then filtered through anhydrous $Na_2SO_4$ and the $Na_2SO_4$ cake washed with 50 ml. of MIBK and the filtrates combined. The MIBK solution was then treated with 8 ml. of sodium 2-ethyl-hexanoate in n-butanol (concentration of 34 ml.=0.1 mole). Scratching induced crystallization and 30 minutes later the product was filtered off, washed with three 100 ml. portions of acetone and air dried. After drying 24 hours under vacuum over $P_2O_5$ there was 8.5 g. of colorless crystals with a decomposition point of 175–176° C.

*Analysis.*—Calc'd for $C_{19}H_{16}ClFN_3O_4S_2Na$: C, 46.34; H, 3.27; N, 8.54%. Found: C, 46.25; H, 3.44; N, 8.20%. (Corrected for 2.67% $H_2O$ determined by the Karl Fischer method.)

EXAMPLE 7

1-amino-2-carbomethoxy-1-(2-chlorophenyl)-1-buten-3-one

A suspension of 25.2 g. (0.1 mole) of 4-carbomethoxy-3-(2-chlorophenyl)-5-methylisoxazole, M.P. 58–59°, prepared by the method of Doyle and Nayler, U.S. Patent 2,996,501, 12.5 g. of Raney nickel and 150 ml. of methanol was hydrogenated in a Parr apparatus at 50 p.s.i.g. for 7.5 hours, during which time the theoretical amount of hydrogen had been absorbed.

Filtration and removal of the methanol in vacuo gave a tan oil that partially crystallized. Crystallization from toluene-"Skellysolve B" gave colorless crystals, M.P. 86–89° C. Recrystallization from benzene-"Skellysolve B" and finally cyclohexane gave crystals with a M.P. of 89–91° C., 14.8 g. (57.5%).

3-(2-chlorophenyl)-5-methyl-4-isothiazolecarboxylic acid (a) $P_2S_5$—$I_2$ *method.*—A mixture of 25.37 g. (0.1 mole) of 1-amino-2-carbomethoxy-1-(2-chlorophenyl)-1-buten-3-one, 66.68 g. (0.3 mole) of phosphorous pentasulfide and 500 ml. of toluene was refluxed for 30 minutes. After cooling to 25°, the mixture was filtered and the toluene was removed under reduced pressure. The residue was treated with 200 ml. of benzene, filtered, and 13.82 g. (0.1 mole) of potassium carbonate and 25.38 g. (0.1 mole) of iodine was added. This mixture was stored at 25° for 30 minutes, then washed with 200 ml. of water containing 0.2 mole of sodium bisulfite. The benzene was removed under reduced pressure and the residue was purified by chromatography on (Merck) alumina. The benzene eluate was concentrated under reduced pressure to a red-orange oil, the infrared spectrum of which was consistent with the desired product. The oil was dissolved in 80 ml. of methanol, 50 ml. of water containing 6 g. of sodium hydroxide was added, and the mixture was refluxed for 1½ hours. After cooling to 25°, the methanol was removed under reduced pressure, the aqueous residue was washed with two 50-ml. portions of ethyl acetate, then acidified with ice cooling with 6 N hydrochloric acid. The precipitate was removed by filtration, washed with water, and dried to yield 8.15 g. (32%) of crystals, M.P. (after recrystallization from toluene) 187–188°.

Calc'd for $C_{11}H_8NO_2SCl$: C, 52.08; H, 3.18; N, 5.52%. Found: C, 52.07; H, 3.28; N, 5.75%.

(b) $P_2S_5$, *S Method.*—A mixture of 50.74 g. (0.2 mole) of 1 - amino - 2 - carbomethoxy-1-(2-chlorophenyl) - 1 - buten - 3 - one, 133.3 g. (0.6 mole) of phosphorous pentasulfide, 19.23 g. of sulfur, and 1 liter of toluene was refluxed for 30 minutes. After cooling to 25°, the insoluble material was removed by filtration and the toluene was removed under reduced pressure. The residue was treated with 500 ml. of benzene, filtered, concentrated to a small volume, then applied to an alumina column. The benzene eluate was collected, and the benzene removed under reduced pressure. The residue was taken up in ethyl acetate, some solid (sulfur) was removed by filtration, and the solvent was removed under reduced pressure to give 22.9 g. of an oil, the infrared spectrum of which was consistent with the desired material. Most of this oil (19.9 g., 0.074 mole) was dissolved in a mixture of 150 ml. of methanol and 50 ml. of water containing 8 g. of sodium hydroxide and the solution was refluxed for 2 hours. After removal of the methanol under reduced pressure, the aqueous solution was washed with two 100-ml. portions of ether, then acidified with cooling with 6 N hydrochloric acid. The precipitate was removed by filtration, washed with water, and dried to yield 17.3 g. (92% hydrolysis yield, 40% overall yield) of crystals, M.P. 187–188° (after recrystallization from toluene).

(c) $P_2S_5$, *Chloranil Method.*—A mixture of 83 g. (0.325 mole) of 1-amino-2-carbomethoxy-1-(2-chlorophenyl)-1-buten-3-one, 217 g. (0.975 mole) of phosphorous pentasulfide, 80 g. (0.325 mole) of chloranil, and 1.75 liters of toluene was refluxed for 30 minutes. After cooling to 25°, the mixture was filtered, and the filtrate was concentrated under reduced pressure to a mixture of oil and solid. This residue was taken up in 400 ml. of benzene, filtered, and concentrated under reduced pressure to a volume of about 200 ml. This solution was placed on a 26½ x 7½ cm. column of (Merck) alumina and eluted with 5 liters of benzene. Concentration of the eluate under reduced pressure yielded 66 g. of a red-orange oil. This oil was refluxed for 2 hours with 400 ml. of methanol and 100 ml. of water containing 13 g. (0.325 mole) of sodium hydroxide. After removal of the methanol under reduced pressure, 100 ml. of water was added, and the resulting solution was filtered, washed with two 300-ml. portions of ether, treated with activated charcoal, then acidified with 6 N hydrochloric acid. The resulting precipitate was removed by filtration, washed with water, and dried under reduced pressure to yield crystals, M.P. 175–181°, the infrared spectrum of which is identical to that of an authentic sample. Recrystallization of this material from toluene (about 300 ml.) yielded 42.6 g. (52%), M.P. 184–185°.

EXAMPLE 8

1-amino-2-carbethoxy-1-phenyl-1-buten-3-one.

A suspension of 231 g. (1.00 mole) of 4-carbethoxy-5-methyl-3-phenylisoxazole, M.P. 43–45° C., prepared by the method of Doyle and Nayler, U.S. Patent 2,996,501, 125 g. of Raney nickel and 2000 ml. of methyl alcohol is hydrogenated in a stirred autoclave at 200–300 p.s.i.g., the theoretical uptake of hydrogen being recorded in 6.5 hours. The mixture is filtered, concentrated to dryness in vacuo and the residue crystallized from toluene to yield the product, M.P. 76–77°.

5-methyl-3-phenyl-4-isothiazolecarboxylic acid

Substitution in the procedure of Example 1 for the 1-amino - 2 - carbomethoxy - 1 - (2,6 - dichlorophenyl)-1-buten-3-one used therein of 1-amino-2-carbethoxy-1-phenyl-1 buten-3-one produces 5-methyl-3-phenyl-4-isothiazolecarboxylic acid, M.P. 154–154.5° C., whose infrared and and nuclear magnetic resonance spectra were identical to that of reference material, M.P. 151–153° C.

EXAMPLE 9

3,5-dimethyl-4-isothiazolecarboxylic acid

Substitution in the procedure of Example 1 for the 1 - amino - 2 - carbomethoxy - 1 - (2,6-dichlorophenyl)-1-buten-3-one used therein of 2-amino-3-carbomethoxy-2-penten-4-one, prepared by the reduction of its corresponding isoxazole [Doyle and Nayler, U.S. Patent 2,996,501 and G. Stagno d'Alcontres, Gazz. Chim. Ital.

80, 441 (1950)], with careful control of the reaction time and temperature, produces 3,5-dimethyl-4-isothiazolecarboxylic acid, M.P. 180°–200° C. (sublimes).

EXAMPLE 10

3-(2,6-dichloro-4-methylphenyl)-5-methyl-4-isothiazolecarboxylic acid

Substitution in the procedure of Example 1 for the 1-amino - 2 - carbomethoxy - 1 - (2,6-dichlorophenyl)-1-buten-3-one used therein of 1-amino-2-carbomethoxy-1-(2,6-dichloro-4-methylphenyl)-1-buten-3-one, prepared by the reduction of its corresponding isoxazole [Doyle and Nayler, U.S. Patent 2,996,501 and G. Stagno d'Alcontres, Gazz. Chim. Ital. 80, 441 (1950)], produces 3-(2,6-dichloro - 4 - methylphenyl) - 5 - methyl - 4 - isothiazolecarboxylic acid.

EXAMPLE 11

5-methyl-3-(2,4,6-trichlorophenyl)-4-isothiazolecarboxylic acid

Substitution in the procedure of Example 1 for the 1-amino - 2 - carbomethoxy - 1 - (2,6 - dichlorophenyl)-1-buten-3-one used therein of 1-amino-1-(2,4,6-trichlorophenyl)-2-carbomethoxy-1-buten-3-one, prepared by the reduction of its corresponding isoxazole as described above, produces 5-methyl-3-(2,4,6-trichlorophenyl)-4-isothiazolecarboxylic acid.

EXAMPLE 12

3-(2-chloro-6-fluoro-4-methoxyphenyl)-5-methyl-4-isothiazolecarboxylic acid

Substitution in the procedure of Example 1 for the 1 - amino - 2 - carbomethoxy - 1 - (2,6-dichlorophenyl)-1-buten-3-one used therein of 1-amino-2-carbomethoxy-1 - (2 - chloro - 6 - fluoro - 4 - methoxyphenyl)-1-buten-3-one, prepared by the reduction of its corresponding isoxazole as described above, produces 3-(2-chloro-6-fluoro - 4 - methoxyphenyl) - 5 - methyl - 4 - isothiazolecarboxylic acid.

EXAMPLE 13

5-methyl-3-(4-trifluoromethylphenyl)-4-isothiazolecarboxylic acid

Substitution in the procedure of Example 1 for the 1 - amino - 2 - carbomethoxy-1-(2-,6-dichlorophenyl)-1-buten-3-one used therein of 1-amino-2-carbomethoxy-1-(4-trifluoromethylphenyl)-1-buten-3-one, prepared by the reduction of its corresponding isoxazole as described above, produces 5-methyl-3-(4-trifluoromethylphenyl)-4-isothiazolecarboxylic acid.

EXAMPLE 14

3-[2,6-di(trifloromethyl)phenyl]-5-methyl-4-isothiazolecarboxylic acid

Substitution in the procedure of Example 1 for the 2 - carbomethoxy - 1 - amino-1-(2,6-dichlorophenyl)-1-buten-3-one used therein of 1-amino-2-carbomethoxy-1-[2,6 - di(trifluoromethyl)phenyl]-1-buten-3-one, prepared by the reduction of its corresponding isoxazole as described above, produces 3-[2,6-di(trifluoromethyl)-phenyl]-5-methyl-4-isothiazolecarboxylic acid.

EXAMPLE 15

3-(4-methoxyphenyl)-5-methyl-4-isothiazolecarboxylic acid

Substitution in the procedure of Example 1 for the 1-amino - 2 - carbomethoxy-1-(2,6-dichlorophenyl)-1-buten-3-one, used therein of 1-amino-2-carbomethoxy-1-(4-methoxyphenyl)-1-buten-3-one, prepared by the reduction of its corresponding isoxazole as described above, produces 3 - (4-methoxyphenyl)-5-methyl-4-isothiazolecarboxylic acid.

EXAMPLE 16

5-methyl-3-(3-nitrophenyl)-4-isothiazolecarboxylic acid

Substitution in the procedure of Example 1 for the 1 - amino - 2 - carbomethoxy-1-(2,6-dichlorophenyl)-1-buten-3-one used therein of 1-amino-2-cyano-1-(3-nitrophenyl)-1-buten-3-one, prepared by the c-acylation of 3-imino-3-(3-nitrophenyl)-propionitrile according to the method of E. Benary et al., Berichte 56, 910 (1923), produces 5 - methyl-3-(3-nitrophenyl)-4-isothiazolecarboxylic acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit of the invention.

We claim:

1. The process for the synthesis of isothiazoles having the formula $$\begin{array}{c} R-C \underset{N}{\overset{\parallel}{\text{---}}} C \underset{S}{\overset{\parallel}{\text{---}}} C-OH \\ \phantom{R-C---}C-R^2 \end{array}$$

wherein:

R and $R^2$ are alike or different and each is (lower) alkyl or Ar—, wherein Ar is a group of the formula $$\underset{B}{\overset{A}{\diagdown}}\!\!\!\bigcirc\!\!\!\underset{C}{\diagup}$$

in which each of A, B and C represent hydrogen, fluoro, chloro, bromo, iodo, trifluoromethyl, methylsulfonyl, nitro, (lower)alkyl and (lower)alkoxy; which comprises:

heating together an aminoketone having the formula $$\begin{array}{c} R^1 \\ R\diagdown \overset{\mid}{C} \diagup R^2 \\ \phantom{R}C\phantom{\diagdown\diagup}C \\ \overset{\mid}{NH_2} \ \overset{\parallel}{O} \end{array}$$

wherein $R^1$ represents $-\overset{O}{\underset{\parallel}{C}}-OH$, $-\overset{O}{\underset{\parallel}{C}}-OR^3$, $-CN$, $-\overset{O}{\underset{\parallel}{C}}-NH_2$ $-\overset{O}{\underset{\parallel}{C}}-NHR^3$ or $-C\overset{O}{\underset{N-R^4}{\diagdown}}R^3$ in which $R^3$ and $R^4$ are alike or different and are each (lower)alkyl or Ar—;

with phosphorus pentasulfide and a mild oxidizing agent to produce an isothiazole having the formula $$\begin{array}{c} R-C \underset{N}{\overset{\parallel}{\text{---}}} C-R^1 \\ \phantom{R-C---}C-R^2 \\ \phantom{R-C---}S \end{array}$$

and when $R^1$ is other than $-CO_2H$, hydrolyzing the resultant, oxidized product to a compound of the formula $$\begin{array}{c} R-C \underset{N}{\overset{\parallel}{\text{---}}} C \underset{S}{\overset{\parallel}{\text{---}}} C-OH \\ \phantom{R-C---}C-R^2 \end{array}$$

by contact with acid or base.

2. The process of claim 1 for the synthesis of isothiazoles having the formula

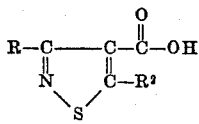

wherein:
R and R² are alike or different and each is (lower)alkyl or Ar—, wherein Ar is a group of the formula

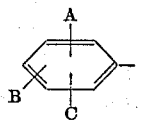

in which each of A, B and C represent hydrogen, fluoro, chloro, bromo, iodo, trifluoromethyl, methylsulfonyl, nitro, (lower)alkyl and (lower)alkoxy; which comprises:
heating together an aminoketone having the formula

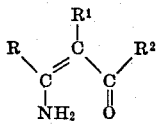

wherein:
R¹ represents

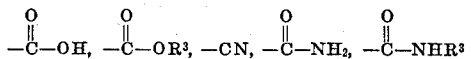

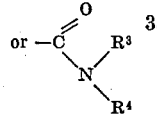

in which R³ and R⁴ are alike or different and are each (lower)alkyl or Ar—;
with phosphorous pentasulfide and
a mild oxidizing group selected from the group of 2,3-dichloro-5,6-dicyano-1,4-benzoquinone, oxygen, air, $I_2$, $Br_2$, $Cl_2$ $H_2O_2$, sulfur, $FeCl_3$, $Na_2S_2O_8$, chloranil or halogen in combination with an acid scavenger in an inert solvent,
to produce an isothiazole having the formula

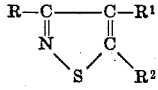

and
when R¹ is other than —CO₂H,
hydrolyzing the resultant, oxidized product to a compound of the formula

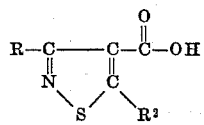

by contact with a strong acid or a strong base with the aid of heat.

3. The process of claim 1 for the synthesis of isothiazoles having the formula

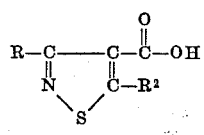

wherein:

R and R² are alike or different and each is (lower)alkyl or Ar—, wherein Ar is a group of the formula

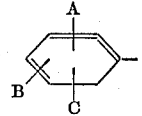

in which each of A, B and C represent hydrogen, fluoro, chloro, bromo, iodo, trifluoromethyl, methylsulfonyl, nitro, (lower)alkyl and (lower)alkoxy; which comprises:
heating together an aminoketone having the formula

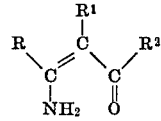

wherein:

R¹ represents—$\overset{O}{\overset{\|}{C}}$—OH, —$\overset{O}{\overset{\|}{C}}$—OR³, —CN, —$\overset{O}{\overset{\|}{C}}$—NH₂, —$\overset{O}{\overset{\|}{C}}$—NHR³

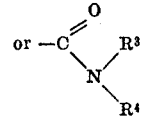

in which R³ and R⁴ are alike or different and are each (lower)alkyl or Ar—;
with phosphorous pentasulfide and
a mild oxidizing agent selected from the group of chloranil, sulfur, iodine in combination with K₂CO₃, or 2,3-dichloro-5,6-dicyano-1,4-benzoquinone;
the aminoketone, the oxidizing agent and the phosphorous pentasulfide are present in a molar ratio of about 1:1:2,
in an inert solvent
at a temperature of about 0°–300°; and
when R¹ is other than —CO₂H,
hydrolyzing the resultant, oxidized product to a compound of the formula

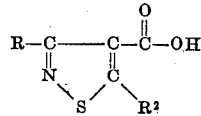

by contact wtih a strong mineral acid or alkali metal base with the aid of heat.

4. The process of claim 1 for the synthesis of isothiazoles having the formula

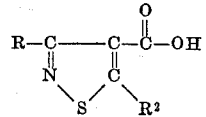

wherein:
R² is (lower) alkyl and
R is Ar, Ar being a group of the formula

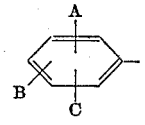

in which each of A, B and C represent hydrogen, fluoro, chloro, bromo, iodo, trifluoromethyl, methylsulfonyl, nitro, (lower)alkyl and (lower)alkoxy; which comprises:
heating together an aminoketone having the formula

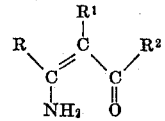

wherein:

R¹ represents 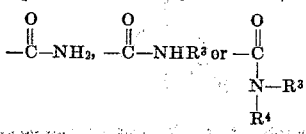

in which R³ and R⁴ are alike or different and are each (lower)alkyl or Ar—;
with phosphorous pentasulfide and a mild oxidizing agent to produce an isothiazole having the formula

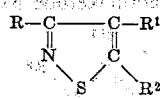

and when R¹ is other than —CO₂H,
hydrolyzing the resultant, oxidized product to a compound of the formula

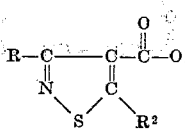

by contact with acid or base.

5. The process of claim 1 for the synthesis of isothiazoles having the formula

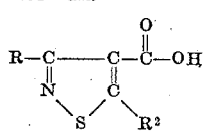

wherein:
R² is (lower)alkyl and
R is Ar, Ar being a group of the formula

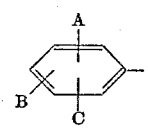

in which each of A, B and C represent hydrogen, fluoro, chloro, bromo, iodo, trifluoromethyl, methylsulfonyl, nitro, (lower)alkyl and (lower)alkoxy; which comprises:
heating together an aminoketone having the formula

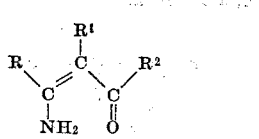

wherein:

R¹ represents —C(O)—OH, —C(O)—OR³,

—CN, —C(O)—NH₂, —C(O)—NHR³ or —C(O)—N(R³)(R⁴)

in which R³ and R⁴ are alike or different and are each (lower)alkyl or Ar—;
with phosphorous pentasulfide and
a mild oxidizing group selected from the group of 2,3-dichloro-5,6-dicyano-1,4-benzoquinone, oxygen, air, I₂, Br₂, Cl₂, H₂O₂, sulfur, FeCl₃, Na₂S₂O₈, chloranil or halogen in combination with an acid scavenger in an inert solvent, to produce an isothiazole having the formula

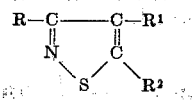

and when R¹ is other than —CO₂H,
hydrolyzing the resultant, oxidized product to a compound of the formula

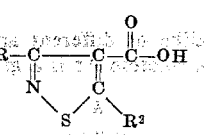

by contact with a strong acid or strong base with the aid of heat.

6. The process of claim 1 for the synthesis of isothiazoles having the formula

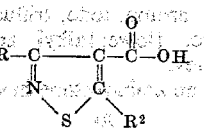

wherein:
R² is (lower)alkyl and R is Ar, Ar being of the formula

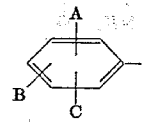

in which each of A, B and C represent hydrogen, fluoro, chloro, bromo, iodo, trifluoromethyl, methylsulfonyl, nitro, (lower)alkyl and (lower)alkoxy; which comprises
heating together an aminoketone having the formula

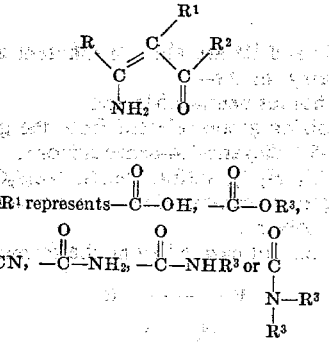

wherein:

R¹ represents —C(O)—OH, —C(O)—OR³,

—CN, —C(O)—NH₂, —C(O)—NHR³ or —C(O)—N(R³)(R³)

in which R³ and R⁴ are alike or different and are each (lower)alkyl or Ar—:
with phosphorous pentasulfide and
a mild oxidizing agent selected from the group of chloranil, sulfur, iodine in combination with K₂CO₃, or 2,3-dichloro-5,6-dicyano-1,4-benzoquinone,
the aminoketone, the oxidizing agent and the phosphorous pentasulfide are present in a molar ratio of about 1:1:2;
in an inert solvent
at a temperature of about 0°–300°; and
when R¹ is other than —CO₂H,
hydrolyzing the resultant, oxidized product to a compound of the formula

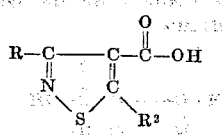

by contact with a strong mineral acid or alkali metal base with the aid of heat.

7. The process of claim 1 for the synthesis of isothiazoles having the formula

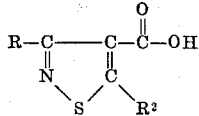

wherein:
$R^2$ is (lower)alkyl and
R is Ar, Ar being a group of the formula

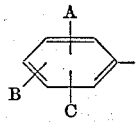

in which each of A, B and C represent hydrogen, fluoro, chloro, bromo, iodo, trifluoromethyl, (lower)alkyl and (lower)alkoxy; which comprises:
heating together an aminoketone having the formula

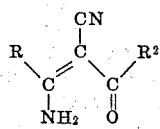

with phosphorous pentasulfide and
a mild oxidizing agent
to produce an isothiazole having the formula

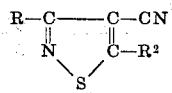

and hydrolyzing the resultant, oxidized product to a compound of the formula

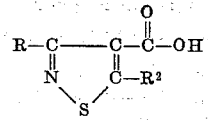

by contact with acid or base.

8. The process of claim 1 for the synthesis of isothiazoles having the formula

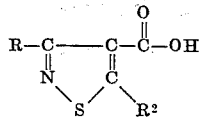

wherein:
$R^2$ is (lower)alkyl and
R is Ar, Ar being a group of the formula

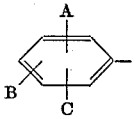

in which each of A, B and C represent hydrogen, fluoro, chloro, bromo, iodo, trifluoromethyl, (lower)alkyl and (lower)alkoxy; which comprises:
heating together an aminoketone having the formula

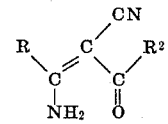

with phosphorous pentasulfide and
a mild oxidizing group selected from the group of 2,3-dichloro-5,6-dicyano-1,4-benzoquinone, oxygen, air, $I_2$, $Br_2$, $Cl_2$, $H_2O_2$, sulfur, $FeCl_3$, $Na_2S_2O_8$, chloranil or halogen in combinatoin with an acid scavenger in an inert solvent, to produce an isothiazole having the formula

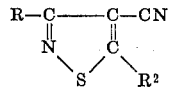

and hydrolyzing the resultant, oxidized product to a compound of the formula

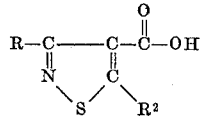

by contact with a strong acid or a strong base with the aid of heat.

9. The process of claim 1 for the synthesis of isothiazoles having the formula

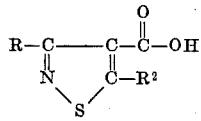

wherein:
$R^2$ is (lower)alkyl and
R is Ar, Ar being a group of the formula

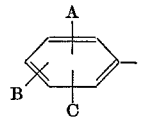

in which each of A, B and C represent hydrogen, fluoro, chloro, bromo, iodo, trifluoromethyl, (lower)alkyl and (lower)alkoxy; which comprises:
heating together an aminoketone having the formula

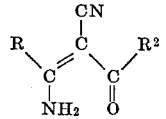

with phosphorous pentasulfide and
a mild oxidizing agent selected from the group of chloranil, sulfur, iodine in combination with $K_2CO_3$, or 2,3-dichloro-5,6-dicyano-1,4-benzoquinone.
the aminoketone, the oxidizing agent and the phosphorous pentasulfide are present in a molar ratio of about 1:1:2;
in an inert solvent
at a temperature of about 0°–300°; and
hydrolyzing the resultant, oxidized product to a compound of the formula

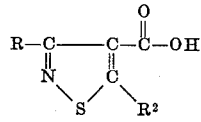

by contact with a strong mineral acid or alkali metal base with the aid of heat.

10. The process of claim 1 for the synthesis of isothiazoles having the formula

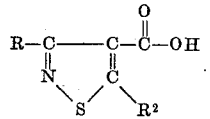

wherein:
$R^2$ is (lower)alkyl and
R is Ar, Ar being a group of the formula

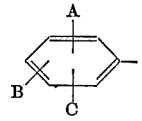

in which each of A, B and C represent hydrogen, fluoro, chloro, bromo, iodo, trifluoromethyl, (lower) alkyl and (lower)alkoxy; which comprises:
heating together an aminoketone having the formula

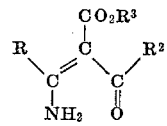

in which $R^3$ is (lower)alkyl or Ar—,
with phosphorous pentasulfide and
a mild oxidizing agent
to produce an isothiazole having the formula

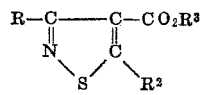

and hydrolyzing the resultant, oxidized product to a compound of the formula

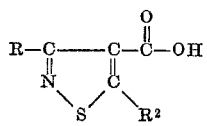

by contact with acid or base.

11. The process of claim 1 for the synthesis of isothiazoles having the formula

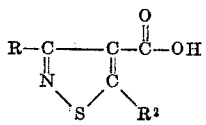

wherein:
$R^2$ is (lower)alkyl and
R is Ar, Ar being a group of the formula

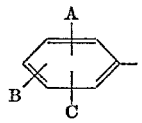

in which each of A, B and C represent hydrogen, fluoro, chloro, bromo, iodo, trifluoromethyl, (lower)-alkyl and (lower)alkoxy; which comprises:
heating together an aminoketone having the formula

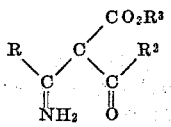

in which $R^3$ is (lower)alkyl or Ar—,
with phosphorous pentasulfide and
a mild oxidizing group selected from the group of 2,3 - dichloro-5,6-dicyano-1,4-benzoquinone, oxygen, air $I_2$, $Br_2$, $Cl_2$, $H_2O_2$, sulfur, $FeCl_3$, $Na_2S_2O_8$, chloranil or halogen in combination with an acid scavenger in an inert solvent,
to produce an isothiazole having the formula

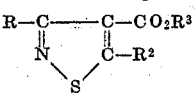

hydrolyzing the resultant, oxidized product to a compound of the formula

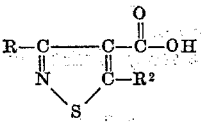

by contact with a strong acid or a strong base with the aid of heat.

12. The process of claim 1 for the synthesis of isothiazoles having the formula

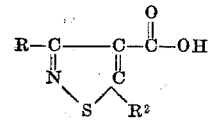

wherein:
$R^2$ is (lower)alkyl and
R is Ar, Ar being a group of the formula

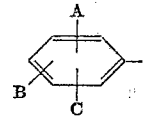

in which each of A, B and C represent hydrogen, fluoro, chloro, bromo, iodo, trifluoromethyl, (lower)-alkyl and (lower)alkoxy; which comprises:
heating together an aminoketone having the formula

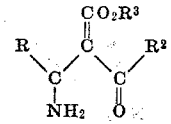

in which $R^3$ is (lower)alkyl or Ar; and,
with phosphorous pentasulfide and
a mild oxidizing agent selected from the group of chloranil, sulfur, iodine in combination with $K_2CO_3$, or 2,3-dichloro-5,6-dicyano-1,4-benzoquinone,
the aminoketone, the oxidizing agent and the phosphorous pentasulfide are present in a molar ratio of about 1:1:2;
in an inert solvent
at a temperature of about 0°–300°; and
hydrolyzing the resultant, oxidized product to a compound of the formula

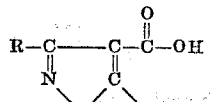

by contact with strong mineral acid or alkali metal base, with the aid of heat.

13. The process of claim 1 for the synthesis of isothiazoles having the formula

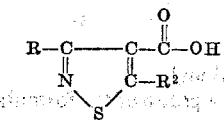

wherein:
R and $R^2$ are alike or different and each is (lower) alkyl or Ar—, wherein Ar is a group of the formula

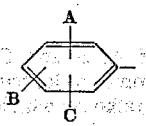

in which each of A, B and C represent hydrogen, fluoro, chloro, bromo, iodo, trifluoromethyl, (lower) alkyl and (lower)alkoxy; which comprises:
heating together an aminoketone having the formula

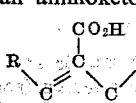

with phosphorous pentasulfide and a mild oxidizing agent to produce an isothiazole having the formula

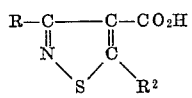

14. The process of claim 1 for the synthesis of isothiazoles having the formula

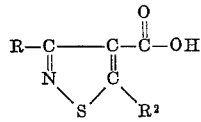

wherein:
R² is (lower)alkyl and
R is Ar, Ar being a group of the formula

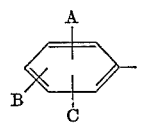

in which each of A, B and C represent hydrogen, fluoro, chloro, bromo, iodo, trifluoromethyl, (lower)alkyl and (lower)alkoxy; which comprises:
heating together and aminoketone having the formula

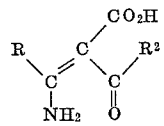

with phosphorous pentasulfide and
a mild oxidizing group selected from the group of 2-3-dichloro-5,6-dicyano-1,4-benzoquinone, oxygen, air, $I_2$, $Br_2$, $Cl_2$, $H_2O_2$, sulfur, $FeCl_3$, $Na_2S_2O_8$, chloranil or halogen in combination with an acid scavenger in an inert solvent,
to produce an isothiazole having the formula

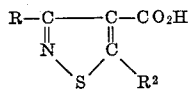

15. The process of claim 1 for the synthesis of isothiazoles having the formula

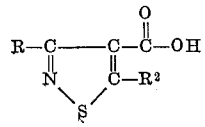

wherein:
R² is (lower)alkyl and
R is Ar, Ar being a group of the formula

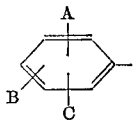

in which each of A, B and C represent hydrogen, fluoro, chloro, bromo, iodo, trifluoromethyl, (lower)alkyl and (lower)alkoxy; which comprises:
heating together an aminoketone having the formula

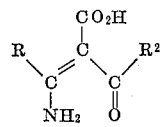

with phosphorous pentasulfide and
a mild oxidizing agent selected from the group of chloranil, sulfur, iodine in combination with $K_2CO_3$, or 2,3 - dichloro-5,6-dicyano-1,4-benzoquinone;
the aminoketone, the oxidizing agent and the phosphorous pentasulfide are present in a molar ratio of about 1:1:2;
in an inert solvent
at a temperature of about 0°–300°.

References Cited

UNITED STATES PATENTS 3,341,518   9/1967   Naito et al. _____ 260—302

OTHER REFERENCES

Guthzeit et al., Berichte, vol. 20, pp. 2111–3, 1887.
Renault, Chem, Abstracts, vol. 45, col. 7572, 1951.
Wagner et al., Synthetic Organic Chemistry, Wiley, 1953, p. 827.

ALEX MAZEL, Primary Examiner

R. J. GALLAGHER, Assistant Examiner

U.S. Cl. X.R.

260—307, 471, 231.1, 465, 558